June 2, 1964    W. I. FLEMING ET AL    3,135,228
PALLET CONSTRUCTION

Filed Jan. 27, 1961    3 Sheets-Sheet 1

INVENTORS:
WALTER I. FLEMING
HERBERT A. KREILICK
BY
ATT'YS

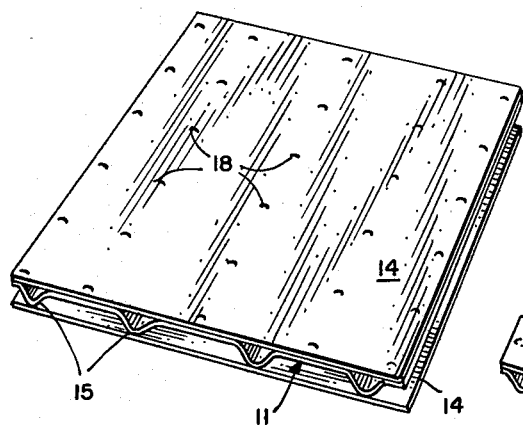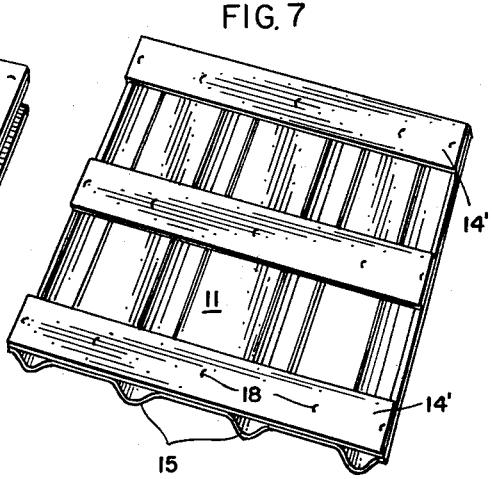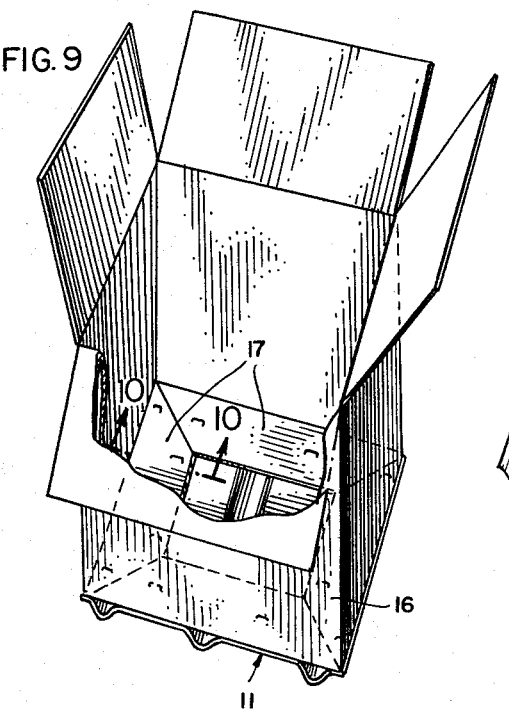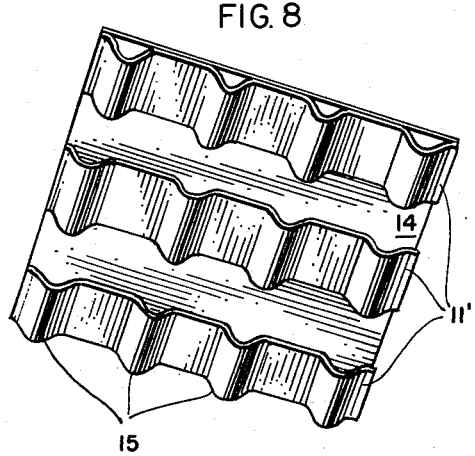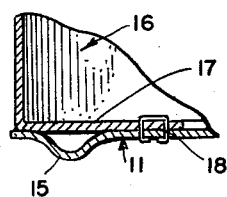

INVENTORS:
WALTER I. FLEMING
HERBERT A. KREILICK
ATT'YS

United States Patent Office 3,135,228
Patented June 2, 1964

3,135,228
PALLET CONSTRUCTION
Walter I. Fleming, Dundee, Ill., and Herbert A. Kreilick, Webster Groves, Mo., assignors to Woodkor Corporation, a corporation of Illinois
Filed Jan. 27, 1961, Ser. No. 85,430
2 Claims. (Cl. 108—55)

This invention relates to improvements in pallets used for mounting loads for storage and/or for ready handling by fork-lift trucks.

The main objects of this invention are to provide an improved structure of pallets used for stacking loads for either storage or for transport from place to place on fork-lift trucks; to provide pallets of this kind of an improved material and structural form; and to provide an improved pallet of this kind which by virtue of the material content and structural form is very inexpensive to manufacture and in use of great stable rigidity and durable utility.

Several specific embodiments of this invention are shown in the accompanying drawings, in which:

FIGS. 6, 7 and 8 are perspective views of other pallet adaptations employing the base elements of the structural form shown in FIGS. 1, 2, 3 or 12;

FIG. 9 is a perspective view of a type of pallet wherein a base element, such as shown in FIG. 1 or FIG. 11, is secured to the bottom of a carton box;

FIG. 10 is an enlarged, fragmentary, sectional view taken on the plane of the line 10—10 of FIG. 9;

Figure 2:
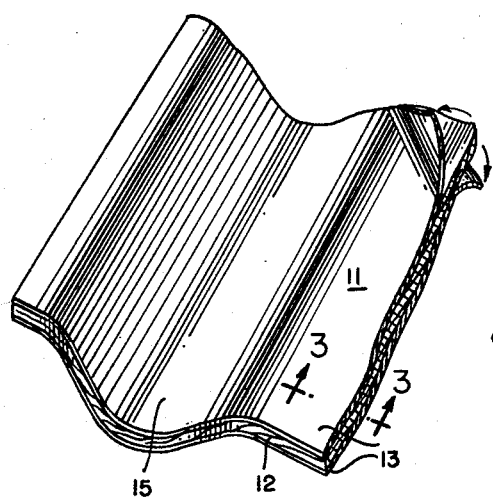
FIG. 2 is a very much enlarged, fragmentary, perspective illustrative of the material and structural form of the base element shown in FIG. 1.

The essential concept of this invention involves a base element structured of thin layers of tough-textured paper or thin wood veneer laminated over a comparatively-thick wood-veneer core and having spaced parallel corrugations extending in one dimension thereof and to one or both faces of which is secured, by bonding, a form-retaining and cargo-supporting flat deck or decks of any of the structures herein shown.

A pallet embodying the foregoing concept comprises a base element 11, composed of wood veneer core 12 over which is laminated either thin paper sheets 13 or thin wood veneers 13a, with one or both faces of the base element 11 being overlaid, in adhesive-bonded relationship, with a form-retaining and cargo-supporting flat deck or decks 14.

Figure 3:
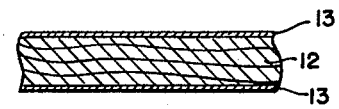
FIG. 3 is an enlarged, fragmentary, cross-sectional view taken on the plane of the line 3—3 of FIG. 2 and showing the relative thicknesses of the laminated material.
Figure 11:
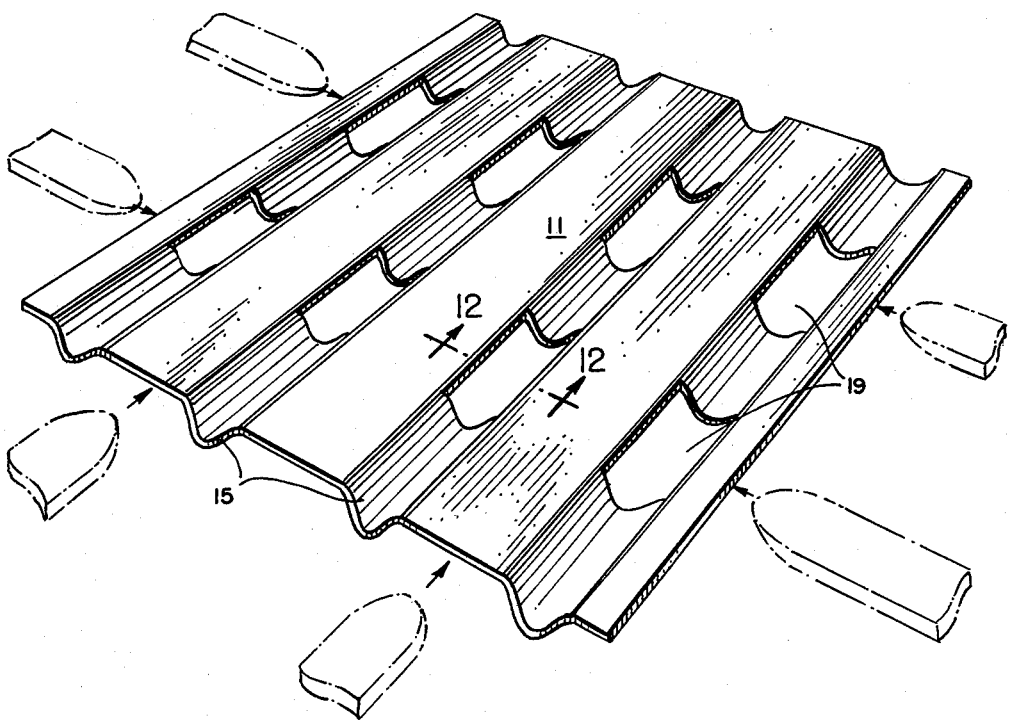
FIG. 11 is a perspective view of a base element structurally different in form and materials from that shown in the other figures.
Figure 12:
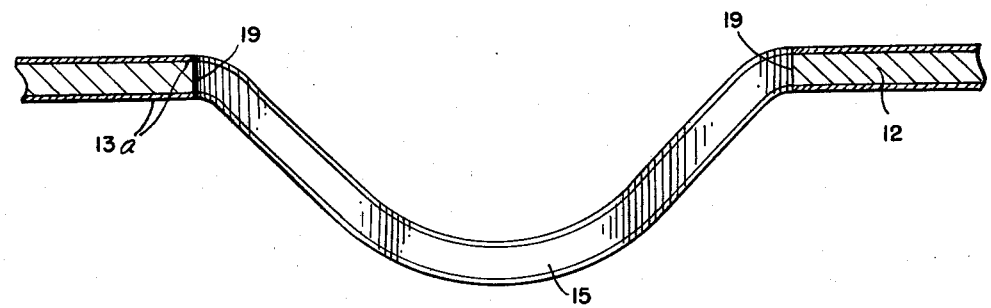
FIG. 12 is a much-enlarged, fragmentary, cross-sectional view of the base element of FIG. 11 as taken on the plane of the line 12—12 of FIG. 11.

The core 12 of thise base element 11, preferably, is a wood veneer such as is used for the core of plywood. The laminated sheets 13 preferably are either a tough-textured paper such, for example, as that commonly referred to as "kraft" paper or a very thin wood veneer. A "kraft" paper laminated wood veneer core of this kind is commercially available and known by the trade name "Craveneer" (FIG. 3). A thin wood-veneer laminated wood-veneer core is commercially available as plywood (FIG. 11). In such plywood the thin exterior veneer generally is a firmer texture than the wood-veneer core.

Whatever the materials constituting the base element 11, it is formed with parallel corrugations 15 extending in one dimension of the base element 11. As herein shown there are four such corrugations, either continuous (FIGS. 1 and 7) or in alignedly-spaced series (FIG. 11). Two of them, being continuous or spaced-series of corrugations, are disposed inwardly adjacent the lateral edges of the base element 11 and the two others evenly spaced between the two laterally-disposed corrugations.

In the modification base element 11 of FIG. 11, before forming the corrugations 15 in the laminated base element, spaced portions 19 of the element are cut out along the areas where the corrugations 15 are to occur, the purpose of which will hereinafter be described.

The deck 14, although it might be of another type, preferably is the same structured material as either of the base element forms 11 herein shown. However, the decks 14 are entirely flat. As a rule the deck 14 extends throughout the full area of the base element 11 and is bonded thereto. On occasion, the deck 14 may be in the form of strips 14' (FIG. 7).

Figure 4:
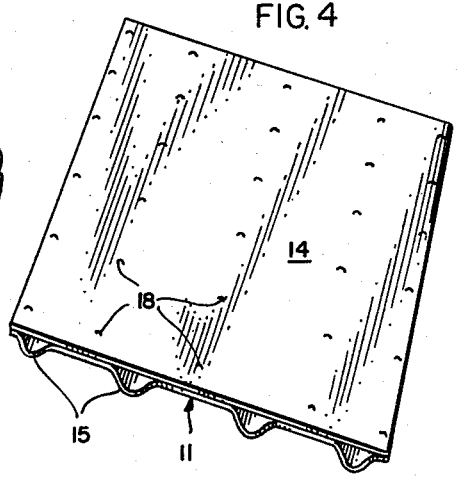
FIG. 4 is a perspective view of one form of pallet employing a base element of the structural form shown in FIGS. 1 and 2 or the form shown in FIG. 11.

There are various ways in which the decks 14 may be arranged with a base element 11 to constitute a pallet. As shown in FIG. 4, a pallet is formed by overlaying, on one face of the base element 11, a deck 14 of the same dimension as the base element 11. The deck 14 overlays the base element 11 in opposition to the concave areas of the corrugations 15. The deck 14 is secured, by suitable bonding means such as by staples or adhesive, to the base element 11 along the contacting areas of the deck 14 and the base element 11. As shown in FIG. 4 this would be along the lateral edges and intermediate the corrugation 15. As a rule stapling, such as shown at 18, would be the preferred bonding means. However, appropriate adhesives could be used as is apparent.

In FIG. 6 two such decks 14 overlay the opposite faces of the base element 11. The bonding of the lower plate 14 would be along the ridges of the corrugations 15, and the upper deck 14 as heretofore described. Thus the base member 11 is additionally strengthened and further prevents collapsing of that member, especially in the event of excessively heavy loads.

In the adaptation shown in FIG. 7, the form-retaining and cargo-supporting deck 14 is in the form of strips 14' located transversely of the corrugations 15 along opposite edges and medially of the base element 11. Obviously such strips may be of the same material and structure that characterizes the other shapes of decks 14.

A still different pallet adaptation is shown in FIG. 8 wherein the base element 11 comprises three strips 11' secured to a rectangular deck 14 along opposite edges and medially thereof. The strips 11' are constructed the same as one or the other base elements 11 heretofore described. A special advantage of this form of pallet, or that using the base element of FIG. 11, is that the lifting forks may be inserted under the pallet from any of the four sides thereof.

Figure 1:
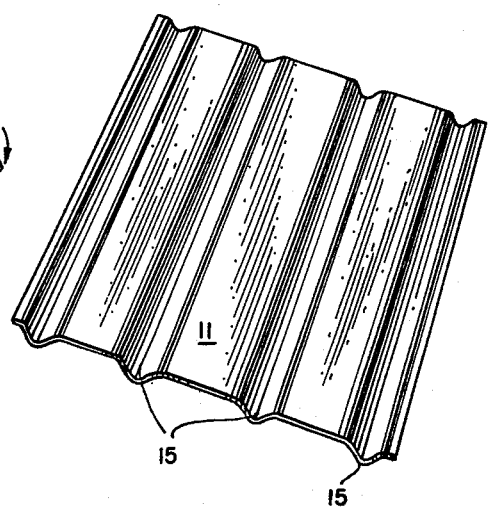
FIGURE 1 is a perspective view of one type of base element structured in accordance with this invention.

A further type of pallet is shown in FIGS. 9 and 10. In this instance the base element 11 (either as shown in FIGS. 1 or 11, or as used in FIG. 8) is secured to the bottom flaps of a carbon box 16. The structure of this carton 16 may be one wherein the bottom comprises narrow flaps 17 mitered along their edges to permit their disposition in a common plane. Or, the carton 16 may be of the conventional type wherein the bottom flaps are dimensioned to overlap and the bottom is bonded to the base element 11 by staples 18 or the like.

In all these adaptations, the securing of the plate 14 (14′) to the base element 11 (strips 11′) preferably would be staples 18. However, any suitable adhesive could be used.

Figure 5:
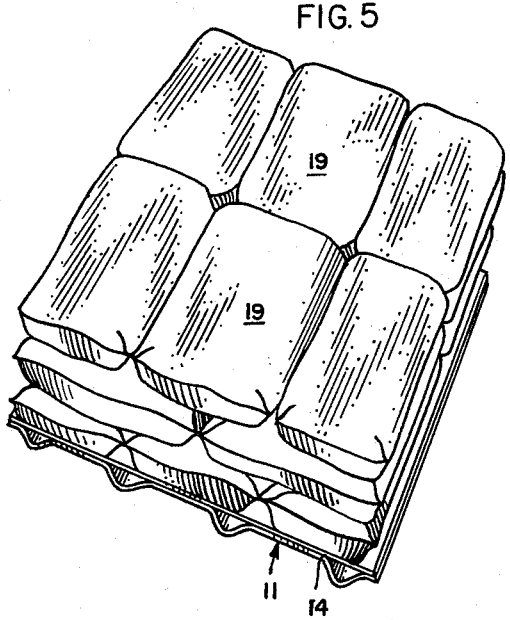
FIG. 5 is a perspective view of a load or cargo of packaged goods arranged on a pallet of the type shown in FIG. 4.

As should now be apparent collapse of the pallet, with substantial weight thereon, see the piled bags in FIG. 5, is prevented by the very nature of the design, i.e. the corrugated base element 11 secured against spreading action by the deck 14, or deck strips 14′ or flaps of the carton 17, and the anchoring of the elements together.

Although several embodiments of this invention are shown herein and described, it will be understood that details of the constructions shown may be altered or omitted without departing from the spirit of the invention as defined by the following claims.

We claim:

1. A load-supporting pallet comprising a one-piece base element structured from thin layers of tough-texture paper laminated on a continuous wood-veneer core and formed with spaced parallel corrugations extending in one dimension, and a flat cargo-supporting deck of the same material as that constituting the base element overlaying one corrugated face of the base element and bonded thereto along the contacting areas to retain the corrugated character of the base element when subject to supporting a load.

2. A pallet comprising a base element structured from thin layers of tough-texture material laminated on a continuous wood-veneer core and formed with spaced parallel corrugations extending in one dimension, and flat cargo-supporting deck strips of the same material as that constituting the base element overlaying one face of the base element along opposite edges and medially transversely of the base element corrugations and bonded together along contacting areas to retain the corrugated character of the base element when subject to a supporting load.

References Cited in the file of this patent

UNITED STATES PATENTS

| | | |
|---|---|---|
| 1,594,112 | Powell | July 27, 1926 |
| 1,835,825 | Thierry | Dec. 8, 1931 |
| 2,544,743 | Vrabcak | Mar. 13, 1951 |
| 2,569,831 | Ryall | Oct. 2, 1951 |
| 2,583,443 | Perry | Jan. 22, 1952 |
| 2,870,981 | Dellinger | Jan. 27, 1959 |
| 2,925,978 | Marso | Feb. 23, 1960 |
| 3,003,204 | Bryant | Oct. 10, 1961 |

FOREIGN PATENTS

| | | |
|---|---|---|
| 696,214 | Great Britain | Aug. 26, 1953 |